US008811478B2

(12) United States Patent
Nakagawa (10) Patent No.: US 8,811,478 B2
(45) Date of Patent: Aug. 19, 2014

(54) DATA TRANSMISSION METHOD AND APPARATUS (75) Inventor: Toshiyuki Nakagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1363 days.

(21) Appl. No.: 11/562,236

(22) Filed: Nov. 21, 2006

(65) Prior Publication Data

US 2007/0122123 A1 May 31, 2007

(30) Foreign Application Priority Data

Nov. 28, 2005 (JP) ................................ 2005-342841

(51) Int. Cl.
*H04N 7/12* (2006.01)
*H04N 21/24* (2011.01)
*H04N 7/173* (2011.01)

(52) U.S. Cl.
CPC ........ *H04N 21/2402* (2013.01); *H04N 7/17336* (2013.01)
USPC .................................................... 375/240.12

(58) Field of Classification Search
CPC ....................... H04N 21/2402; H04N 7/17336
USPC ......................... 375/240.12; 725/38; 709/231
See application file for complete search history.

(56) References Cited

U.S. PATENT DOCUMENTS

| 5,991,503 | A | * | 11/1999 | Miyasaka et al. | ............. 386/329 |
| 6,812,955 | B2 | | 11/2004 | Takaki et al. | ............. 348/14.08 |
| 7,562,375 | B2 | * | 7/2009 | Barrett et al. | ................... 725/38 |
| 2003/0005139 | A1 | | 1/2003 | Colville et al. | ............... 709/231 |
| 2006/0242240 | A1 | * | 10/2006 | Parker et al. | .................. 709/205 |

FOREIGN PATENT DOCUMENTS

| JP | 05-252511 | | 9/1993 | ............. H04N 7/15 |
| JP | 06-189295 | A | 7/1994 | |
| JP | 2002-305733 | | 10/2002 | ............. H04N 7/15 |
| JP | 2003-143583 | A | 5/2003 | |

OTHER PUBLICATIONS

Japanese Office Action dated Jul. 15, 2011, issued in counterpart Japanese Patent Application No. 2005-342841, with translation.
Japanese Office Action dated Jul. 15, 2011, issued in counterpart Japanese Patent Application No. 2005-342841.

* cited by examiner

*Primary Examiner* — Richard Torrente
(74) *Attorney, Agent, or Firm* — Fitzpatrick, Cella, Harper & Scinto (57) ABSTRACT

A data transmission method and apparatus that both codes a moving picture and records the coded moving picture data, transmitting the coded moving picture data immediately to a receiving terminal that is not a latecomer terminal from among a plurality of receiving terminals and begins transmission to a latecomer receiving terminal from recorded past moving picture data. This transmission method enables the communication band to be used efficiently, and further, at low cost, in addition to which playback can begin promptly at the receiving terminals.

20 Claims, 7 Drawing Sheets

DATA TRANSMISSION METHOD AND APPARATUS

BACKGROUND OF THE INVENTION

1. Field of the Invention

The present invention relates to a data transmission apparatus and a method for transmitting moving picture data, and more particularly, to a moving picture data transmission apparatus and a method for transmitting so as to enable playback of coded moving picture data immediately at a plurality of receiving terminals.

2. Description of the Related Art

Recently, with the spread of ADSL (Asymmetric Digital Subscriber Line), FTTH (Fiber To The Home) and the like, the broadbanding of computer networks has proceeded rapidly. Further, the processing capability of various computing devices, beginning with the personal computer (PC), continues to improve.

Against this backdrop of improvement in the performance of the communication environment as well as the data processing environment, streaming technology that distributes multimedia data, such as moving picture data and audio data, in real time over networks has been commercialized. With this streaming technology, the user can enjoy broadcasted live media or pre-recorded media, enjoy pre-recorded media on demand, and so forth.

Generally, communication methods called multicast and unicast are used in the distribution of this type of video content. Multicasting is a technology for transmitting one packet to a specified number of receiving terminals, and a multicast packet is copied by the appropriate router along the transmission path and transmitted to the receiving terminals. By contrast, unicasting is one-on-one communication, and when transmitting to multiple terminals it is necessary to copy the packet on the sending terminal end and specify each and every receiving terminal, although it is possible to transmit data to a specified number of terminals.

In addition, as a data transmission method for distributing moving picture and audio multimedia data over a network, RTP (Real-time Transfer Protocol) is known. RTP is defined as RFC1889 and RFC1890 by the IETF (Internet Engineering Task Force), and is a protocol for data transmission of audio and video in real time.

Multimedia data, in particular moving picture data, can be too large in size to be transmitted as is, and therefore it is usually compression-encoded before distribution. A variety of efforts is being undertaken in order to achieve high data compression rates while minimizing deterioration in picture quality, of which the MPEG-2 format and the MPEG-4 format standardized by the ISO (International Organization for Standardization) as international standards are well-known representative coding technologies.

In these MPEG compression coding formats, prediction coding is applied to the frames that make up the moving picture. Depending on the type of prediction coding applied, the frames are divided into one of three types: I frame, P frame or B frame. An I frame is an intraframe picture encoded within the frame, a P frame is an interframe forward prediction coded picture that uses the past picture frame prior to the frame that is to be encoded, and a B frame is an interframe bidirectional prediction coded picture that uses both the previous and the next picture frames. Of these three types of coded frames, only the I frame can be decoded without using information from another picture frame.

When distributing moving pictures encoded using these types of prediction coding over a network, unless data from the I frame is received the moving pictures cannot be properly decoded and played back at the receiving end. As a result, it is necessary to start transmission to the receiving terminal from an I frame. However, when streaming live video, the moving picture frame that can be transmitted when a request for distribution is received from the receiving terminal is not always an I frame. If no request for distribution comes when it comes time to transmit an I frame, it is not possible to start transmission until the next I frame is coded. Otherwise, the picture cannot be decoded on the receiving end even if transmitted. The end result is that a delay occurs at the receiving terminal until playback starts.

Temporarily switching the coding format to intraframe coding when there is a new request for distribution in an apparatus that transmits stream data by unicast is disclosed in JP-A-2002-305733.

In addition, in JP-A-H05-252511, in a case in which the transmission apparatus is routinely carrying out both intraframe coding and interframe coding and there is a new request for distribution during transmission, carrying out transmission from the I frame only for the receiving terminal that originates that request is proposed.

With the method that is proposed in JP-A-2002-305733, when a new receiving terminal is added during distribution that is already in progress (hereinafter such a receiving terminal is referred to as a latecomer terminal), the coding format switches to intraframe coding. By doing so, however, although it makes possible playback without delay at the receiving terminal, an I frame is also transmitted to the existing terminals as well. Generally, the compression efficiency for intraframe coding is lower than that for interframe coding and the data volume is greater, and consequently, the addition of a latecomer terminal results in additional communication band consumption.

Moreover, the system proposed by JP-A-H05-252511 involves a technique of routinely conducting both intraframe coding and interframe coding and carrying out transmission of an I frame only for the latecomer terminal. As a result, either a special coding circuit that routinely carries out both types of coding or two coding circuits—a coding circuit for carrying out intraframe coding and a coding circuit for carrying out interframe coding—are required, which becomes very expensive.

SUMMARY OF THE INVENTION

The present invention is conceived in light of the foregoing problems, and has as its object to provide a data transmission apparatus and method capable of transmitting coded moving picture data for which playback can start promptly at the receiving terminal, and doing so while efficiently using the communication band, and further, at low cost.

According to an aspect of the present invention, there is provided a data transmission apparatus for transmitting coded moving picture data to a receiving terminal comprising: a storage unit to which coded data composed of frames coded using intraframe prediction coding and frames coded using interframe prediction coding is input, and which stores the coded data; a packet generation unit that generates a packet to be transmitted to a receiving terminal from incoming the coded data or from past coded data stored in the storage unit; and a transmission unit that transmits to the receiving terminal a packet generated by the packet generation unit, wherein the packet generation unit selects coded data to be used to generate a packet to be transmitted first to the receiving terminal from either the incoming coded data or from past coded data stored in the storage unit based on the timing of a reception of a request to transmit from the receiving terminal and on the type of coding of coded data input into the packet generation unit, so that the first packet transmitted to the receiving terminal is generated from a frame coded using the intraframe prediction coding.

According to another aspect of the present invention, there is provided a data transmission apparatus for coding moving picture data and transmitting the coded moving picture data to a receiving terminal, comprising: a coding unit that codes moving picture data using both intraframe prediction coding and interframe prediction coding; a storage unit that stores moving picture data coded by the coding unit; and a packet generation unit that generates a packet to be transmitted to a receiving terminal from moving picture data coded by the coding unit or from past coded moving picture data stored in the storage unit; and a transmission unit that transmits to the receiving terminal a packet generated by the packet generation unit, wherein the packet generation unit selects the first packet transmitted from either moving picture data coded by the coding unit or from past coded moving picture data stored in the storage unit, so that the first packet transmitted to the receiving terminal is generated from moving picture data coded using the intraframe prediction coding, based on the timing of a reception of a request to transmit from the receiving terminal and on the type of coding of incoming coded data from the coding unit.

According to another aspect of the present invention, there is provided a data transmission method for transmitting coded moving picture data to a receiving terminal comprising: a storage step that stores coded data composed of frames coded using intraframe prediction coding and frames coded using interframe prediction coding in a storage unit; a packet generation step that generates a packet to be transmitted to a receiving terminal from incoming the coded data or from past coded data stored in the storage unit; and a transmission step that transmits to the receiving terminal a packet generated in the packet generation step, wherein the packet generation step selects coded data to be used to generate a packet to be transmitted first to the receiving terminal from either the incoming coded data or from past coded data stored in the storage unit based on the timing of a reception of a request to transmit from the receiving terminal and on the type of coding of coded data input in the packet generation step, so that the first packet transmitted to the receiving terminal is generated from a frame coded using the intraframe prediction coding.

According to another aspect of the present invention, there is provided a data transmission method for transmitting coded moving picture data to a receiving terminal comprising: a packet generation step in which coded data composed of frames coded using intraframe prediction coding and frames coded using interframe prediction coding is input, and which generates a packet to be transmitted to a receiving terminal from the input coded data or from past coded data stored in a storage unit; and a transmission step that transmits to the receiving terminal a packet generated in the packet generation step, wherein the packet generation step selects coded data to be used to generate a packet to be transmitted first to the receiving terminal from either the incoming coded data or from past coded data stored in the storage unit based on the timing of a reception of a request to transmit from the receiving terminal and on the type of coding of coded data input in the packet generation step, so that the first packet transmitted to the receiving terminal is generated from a frame coded using the intraframe prediction coding.

According to another aspect of the present invention, there is provided a data transmission method for coding moving picture data and transmitting the coded moving picture data to a receiving terminal, comprising: a coding step that codes moving picture data using both intraframe prediction coding and interframe prediction coding; a storage step that stores moving picture data coded in the coding step in a storage unit; and a packet generation step that generates a packet to be transmitted to a receiving terminal from moving picture data coded in the coding step or from past coded moving picture data stored in the storage unit; and a transmission step that transmits to the receiving terminal a packet generated in the packet generation step, wherein the packet generation step selects the first packet transmitted from either moving picture data coded in the coding step or from past coded moving picture data stored in the storage unit, so that the first packet transmitted to the receiving terminal is generated from moving picture data coded using the intraframe prediction coding, based on the timing of a reception of a request to transmit from the receiving terminal and on the type of coding of incoming coded data from the coding step.

According to the present invention, it is possible to provide a data transmission apparatus and method capable of transmitting coded moving picture data for which playback can start promptly at the receiving terminal, and doing so while efficiently using the communication band, and further, at low cost.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

It should be noted that, in the following description, an explanation is given of an embodiment that applies the present invention to a transmission apparatus that uses MPEG-4 as the moving picture data coding format and RTP as the transfer protocol for the coded moving picture data. However, the moving picture data coding format is not limited to MPEG-4, and therefore, for example, it is possible to use such coding formats as MPEG-2 or H.264, which employ both intraframe prediction coding and interframe prediction coding together. Put more broadly, it is possible to use a moving picture data coding format to carry out coding of frame units using both a coding format that does not require other frame information when decoding and a coding format that does require other frame information when decoding. Moreover, the data transfer protocol is not limited to RTP, and therefore it is possible to use other data transfer protocol.

First Embodiment

Figure 1:
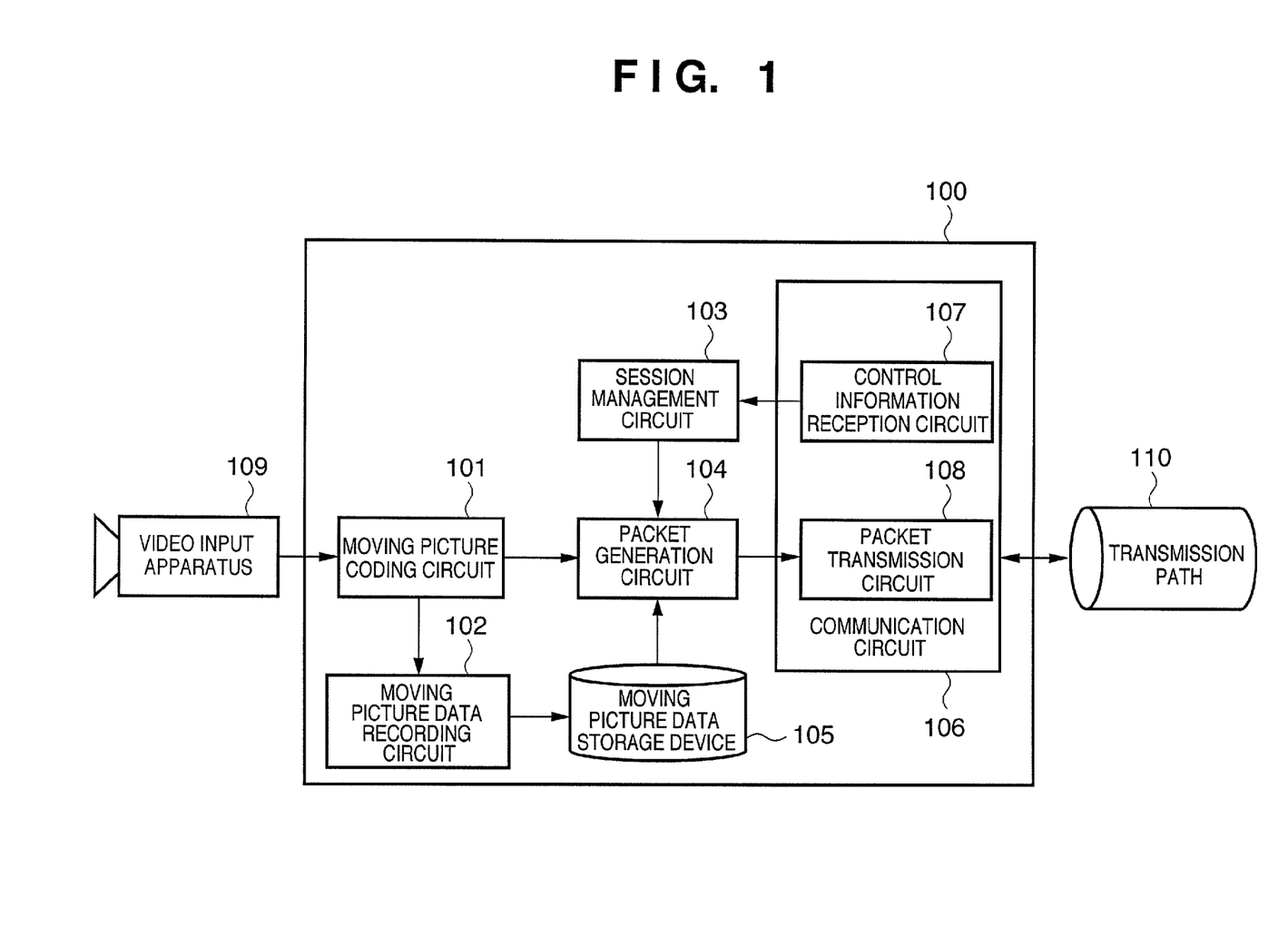
FIG. 1 is a block diagram showing an example of the basic structure of a data transmission apparatus according to a first embodiment of the present invention.

FIG. 1 is a block diagram showing an example of the basic structure of a data transmission apparatus according to a first embodiment of the present invention.

A data transmission apparatus 100 is composed of a moving picture coding circuit 101, a moving picture data recording circuit 102, a session management circuit 103, a packet generation circuit 104, a moving picture data storage device 105, and a communication circuit 106. In addition, the communication circuit 106 is further composed of a control information reception circuit 107 and a packet transmission circuit 108. In FIG. 1, reference numeral 110 denotes a transmission path typified by a variety of networks, and in this embodiment is a network that transmits moving picture data.

The communication circuit 106 receives control information from the receiving terminal at the control information reception circuit 107 via the transmission path 110. The control information consists of requests from the receiving terminal, such as a request to transit moving picture data, and responses from the transmitting terminal in response to requests from the receiving terminal. The control information conforms to a communication control protocol typified, for example, by such protocols as RTSP (Real Time Streaming Protocol), H.323, and SIP (Session Initiation Protocol).

The above-described control information is input to the session management circuit 103, with sessions managed receiving terminal by receiving terminal.

The moving picture coding circuit 101 codes the moving pictures, input from an video input apparatus 109 such as a video camera or a web camera, based on MPEG-4. The moving picture data coded at the moving picture coding circuit 101 is input to the packet generation circuit 104 as well as to the moving picture data recording circuit 102, and recorded in the moving picture data storage device 105. The moving picture data storage device 105 may be a magnetic storage device such as a hard disk drive, an optical storage device such as an optical disk, or a semiconductor storage device or the like.

Figure 2:
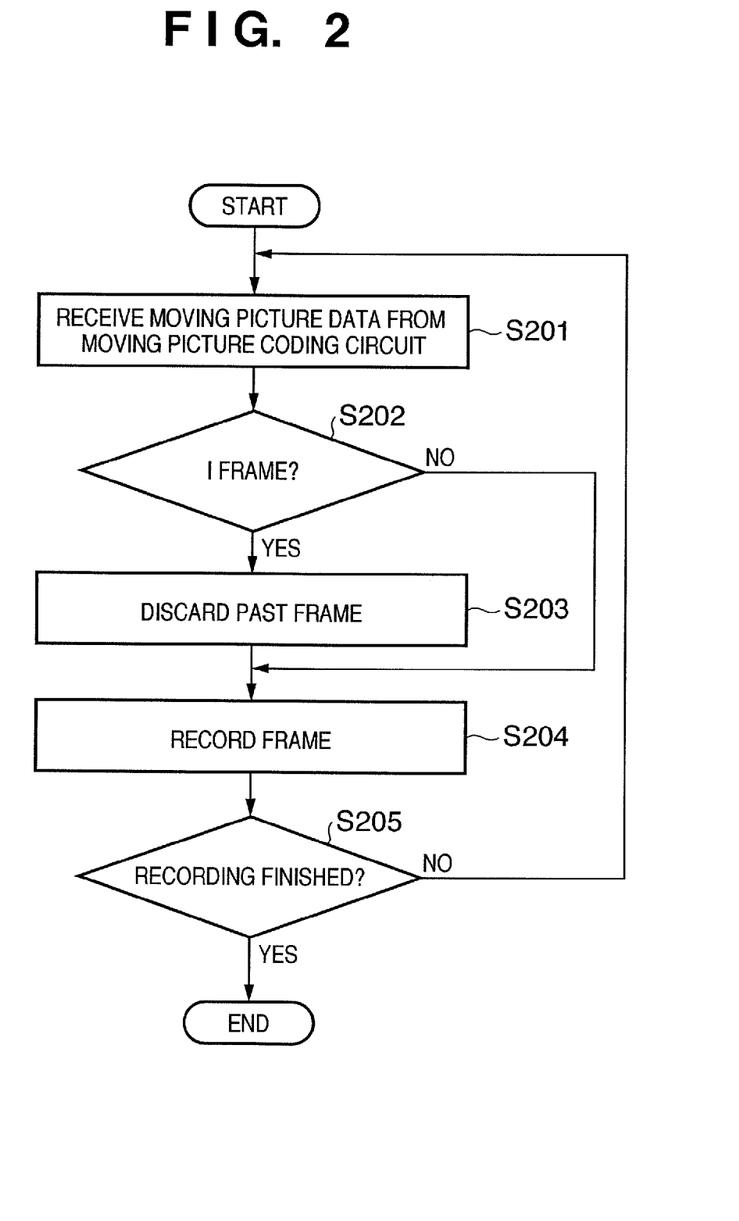
FIG. 2 is a flow chart illustrating the operation of a moving picture data recording circuit 102 of the data transmission apparatus according to the first embodiment of the present invention.

FIG. 2 is a flow chart illustrating the operation of the moving picture data recording circuit 102.

First, the moving picture data recording circuit 102 receives coded moving picture data from the moving picture coding circuit 101 (step S201). The coded moving picture data received here is usually units of individual moving picture frames or a chronologically continuous series of moving picture frames. In the present embodiment, for simplicity, the description assumes that the moving picture data recording circuit 102 receives individual coded frames of moving pictures.

After step S201, it is determined whether or not the received coded frame is an I frame (step S202). Then, if it is determined that the frame is an I frame, the moving picture data storage device 105 discards all pre-recorded past frames (step S203).

If it is determined in step S202 that the received frame is not an I frame, or after discarding past frames in step S203, processing proceeds to step S204. Then, the coded frame received from the moving picture coding circuit 101 in step S201 is recorded in the moving picture data storage device 105.

Once individual recorded frames of moving pictures are recorded as described above, it is determined whether or not the recording process is to be finished (step S205). If it is determined that the recording process is to be finished, processing ends. If it is determined that the recording process is to be continued, processing returns to step S201 and the process of recording the succeeding moving picture data is conducted until recording is finished.

The recording process is to be finished either when there are no more receiving terminal sessions managed by the session management circuit 103 or when the transmitting terminal finishes transmitting to all receiving terminals.

By such processing, a group of frames from the immediately preceding I frame to the current time frame are recorded at a maximum in GOV (Group of Video Object Plane) units in the moving picture data storage device 105, and the past GOV data is discarded. A GOV is a group of MPEG-4 frames from one moving picture I frame to the frame immediately preceding the next I frame.

Figure 3:
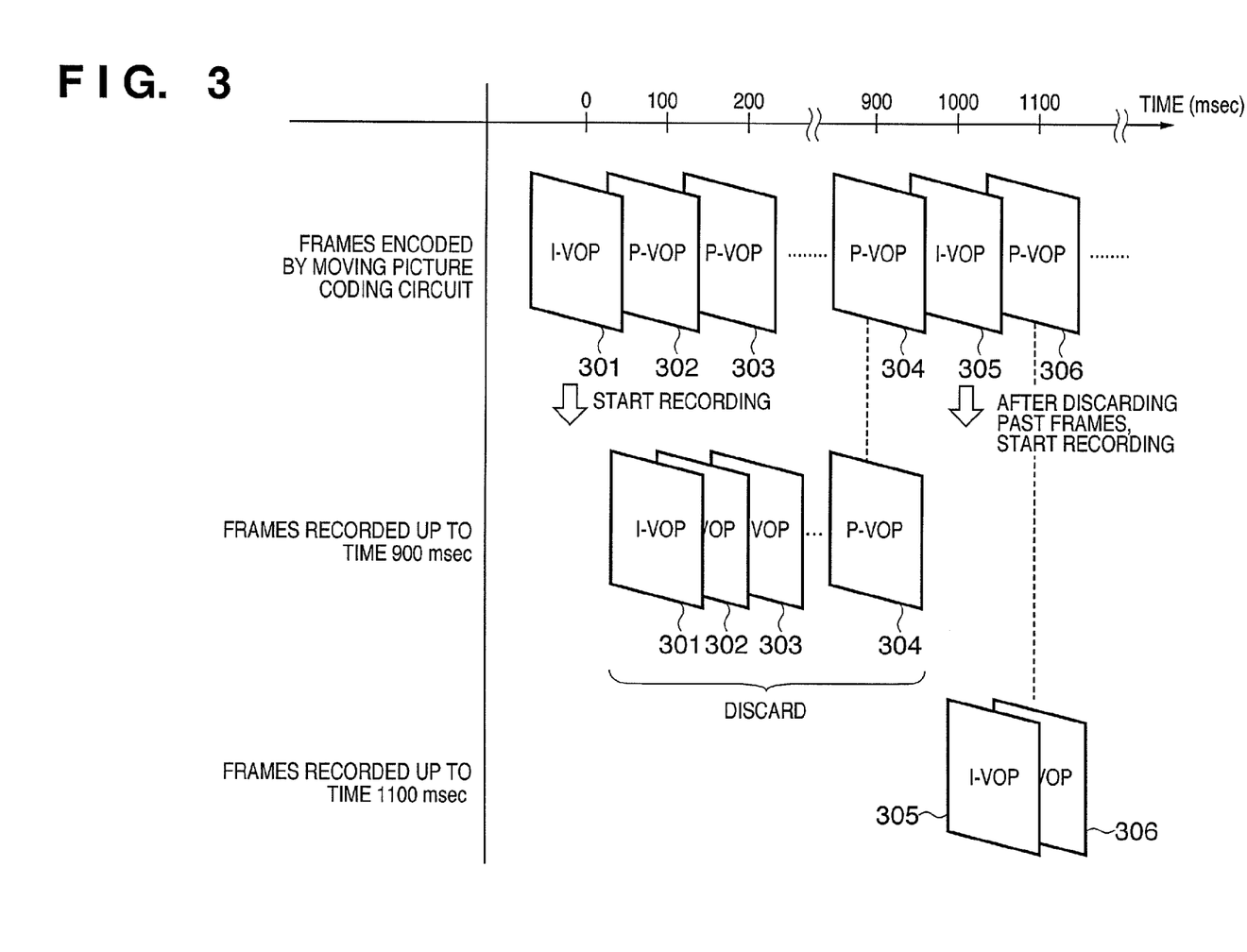
FIG. 3 is a diagram showing the relation between moving picture frames encoded by a moving picture coding circuit 101 and moving picture frames recorded by a moving picture data recording circuit 102 over time in the data transmission apparatus according to the first embodiment of the present invention.

FIG. 3 is a diagram showing the relation between moving picture frames encoded by the moving picture coding circuit 101 and moving picture frames recorded by the moving picture data recording circuit 102 over time.

Reference numerals 301 to 306 indicate frames of moving picture data (VOP) coded by the moving picture coding circuit 101. I-VOP indicates an I frame and P-VOP indicates a P frame. The coding frame rate is 10 fps (10 frames are encoded per second), with individual frames coded at intervals of 100 milliseconds. Frame 301 coded at time 0 milliseconds and frame 305 coded at time 1000 milliseconds are I frames. The remaining frames 302-304 and 306 coded at all other times are P frames.

It should be noted that frames also exist between frame 303 at time 200 milliseconds and frame 304 at 900 milliseconds, as well as after time 1100 milliseconds, although these frames are not shown in FIG. 3.

When the moving picture data recording circuit 102 records the moving picture frames 301-306 coded at the moving picture coding circuit 101, it starts recording from I frame 300 at time 0 milliseconds and records the succeeding P frames (302-304) in order with the passage of time. The moving picture frames recorded as described up to time 900 milliseconds become frames 301-304 shown in the drawing.

Next, since frame 305 coded at time 1000 milliseconds is an I frame, moving picture frames 301-304 recorded from time 0 milliseconds to time 900 milliseconds are discarded and recording begins once more from I frame 305. P frames 306 and the following P frames thereafter are recorded in order with the passage of time. The moving picture frames recorded as described up to time 1100 milliseconds become frames 305-306 shown in the drawing.

The moving picture data recorded as described above in the moving picture data storage device 105 by the moving picture data recording circuit 102 is transmitted to one or more receiving terminals as described later. At that time, the data is packeted at the packet generation circuit 104 and transmitted to the receiving terminal(s) specified by the session management circuit 103 via the packet transmission circuit 108.

Figure 4:
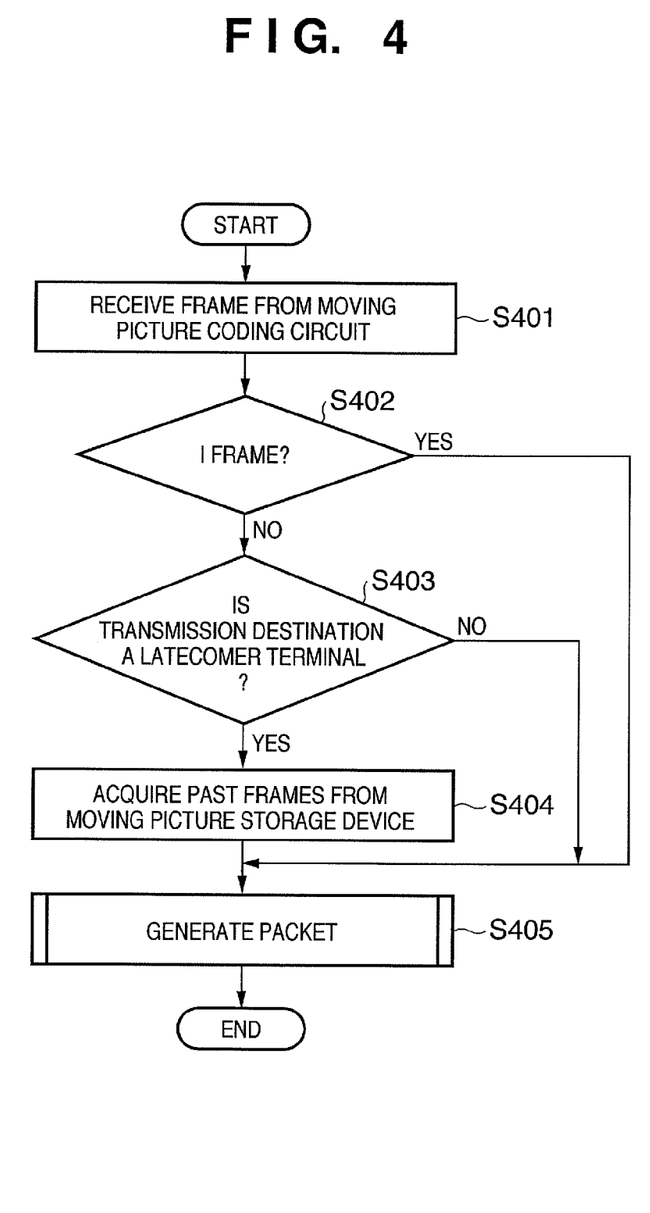
FIG. 4 is a flow chart illustrating a packet generation process of a packet generation circuit 104 in the data transmission apparatus according to the first embodiment of the present invention.

FIG. 4 is a flow chart illustrating the packet generation process of the packet generation circuit 104.

First, the packet generation circuit 104 receives a coded moving picture frame from the moving picture coding circuit 101 (step S401) and determines whether or not the received frame is an I frame (step S402).

If it is determined in step S402 that the received frame is an I frame, processing shifts to step S405 to generate a packet from the current time frames received from the moving picture coding circuit 101 in step S401.

If it is determined in step S402 that the received frame is not an I frame, it is further determined whether or not the receiving terminal that is the moving picture data transmission target is a latecomer terminal (step S403). This determination can be made by using session information for the receiving terminal obtained from the session management circuit 103. For example, in a state in which another session distributing moving picture data is already in progress, it can be determined that the receiving terminal of a session generated by reception of a request for distribution is a latecomer terminal.

If in step S403 it is determined that the addressee is not a latecomer terminal, processing proceeds to step S405 and a packet is generated from the current frames received from the moving picture coding circuit 101 in step S401.

If it is determined in step S403 that the addressee is a latecomer terminal, then the past frames that are recorded in the moving picture data storage device 105 are acquired (step S404). In this manner, the packet generation circuit 104 selects the moving picture data that generates the packet so that the first packet that is transmitted to the receiving terminal is generated from moving picture data of a frame coded by intraframe coding, specifically, generating a packet from either moving picture data coded by the moving picture coding circuit 101 or moving picture data stored in the moving picture data storage device 105.

In step S405, depending on whether or not the address receiving terminal is a latecomer terminal, a packet is generated from the current frames received from the moving picture coding circuit 101 in step S401 or from past frames acquired from the moving picture data storage device 105 in step S404. As described above, in the present embodiment, it is assumed that the MPEG-4 moving picture data is transmitted by RTP. Therefore, an RTP packet is constructed according to RFC1889 or RFC1890, and packet payload data is generated according to the MPEG-4 moving picture payload format defined by RFC3016. It should be noted that, with an RTP packet, the packet payload data initial octet sampling time is included in the header time stamp field, with the payload data coming after the packet header.

The packet generated at the packet generation circuit 104 as described above is transmitted by the packet transmission circuit 108 to the receiving terminal that is the transmission target via the transmission path 110.

Figure 5:
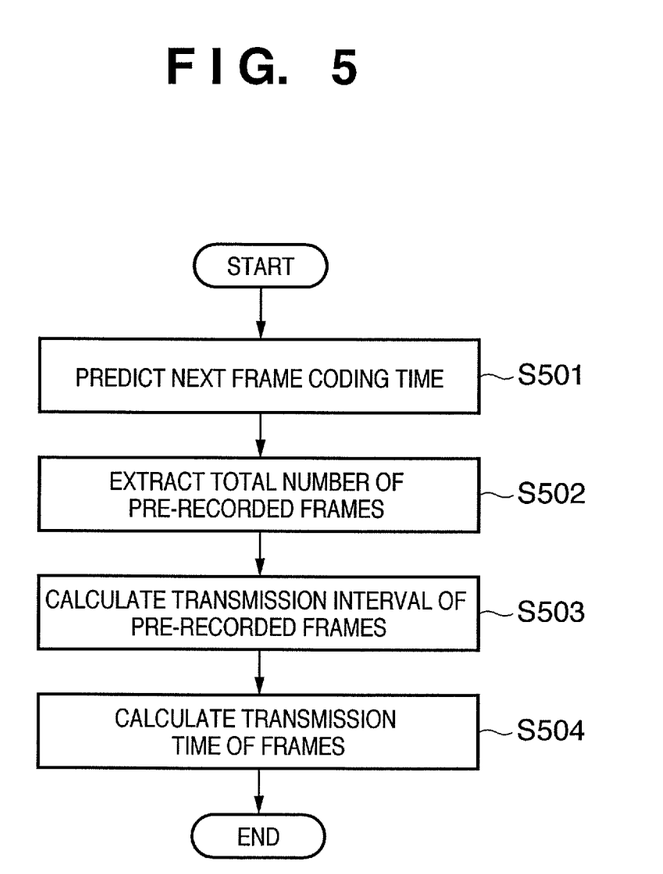
FIG. 5 is a flow chart illustrating a packet transmission process of a packet transmission circuit 108 in the data transmission apparatus according to the first embodiment of the present invention.

Next, a description is given of the packet transmission process of the packet transmission circuit 108 using the flow chart shown in FIG. 5.

FIG. 5 is a flow chart illustrating a process in which the packet transmission circuit 108 determines the timing of the transmission of a packet generated from past moving picture frames acquired from the moving picture data storage device 105. It should be remembered that a packet generated from current moving picture frames acquired from the moving picture coding circuit 101 is transmitted immediately.

First, the packet transmission circuit 108 predicts the time at which the next frame is encoded by the moving picture coding circuit 101 (step S501). This time can be predicted from the moving picture coding frame rate (f [fps] (frames per second)) according to equation (1) described later. For example, if the frame rate is 10 fps, then the time interval of the frames is 100 milliseconds, and a time that adds to this time interval the time (t1) at which the immediately preceding frame is coded is a predicted time (t2) at which the next frame is coded:

$$t2 = t1 + 1000/f \quad (1)$$

Next, the packet transmission circuit 108 acquires the total number of frames (e) already recorded in the moving picture data storage device 105 (step S502). Then, the packet transmission circuit 108 calculates the transmission time interval (t3) of the frames when acquiring and transmitting past frames from the moving picture data storage device 105 (step S503). The method of calculation involves dividing the difference between the next frame coding time (t2) predicted in step S501 and the current time (t4) by the total number of frames (e) extracted in step S502 according to equation (2) described below:

$$t3 = (t2 - t4)/e \quad (2)$$

Finally, the packet transmission circuit 108 calculates the transmission time (t5) of the frames (step S504). The method of calculation involves adding to the current time (t4) the transmission time interval (t3) of the frames calculated in step S503 multiplied by an integer (n−1) according to equation (3) described below, where n is the order of the frames extracted in chronological order from the moving picture data storage device 105 and n=1, 2, . . . , e:

$$t5 = t4 + t3 \times (n-1) \quad (3)$$

In other words, the first I frame (n=1) extracted from the moving picture data storage device 105 is transmitted immediately at the current time and the succeeding P frames are transmitted in order according to the transmission times obtained using the equations described above.

Figure 6:
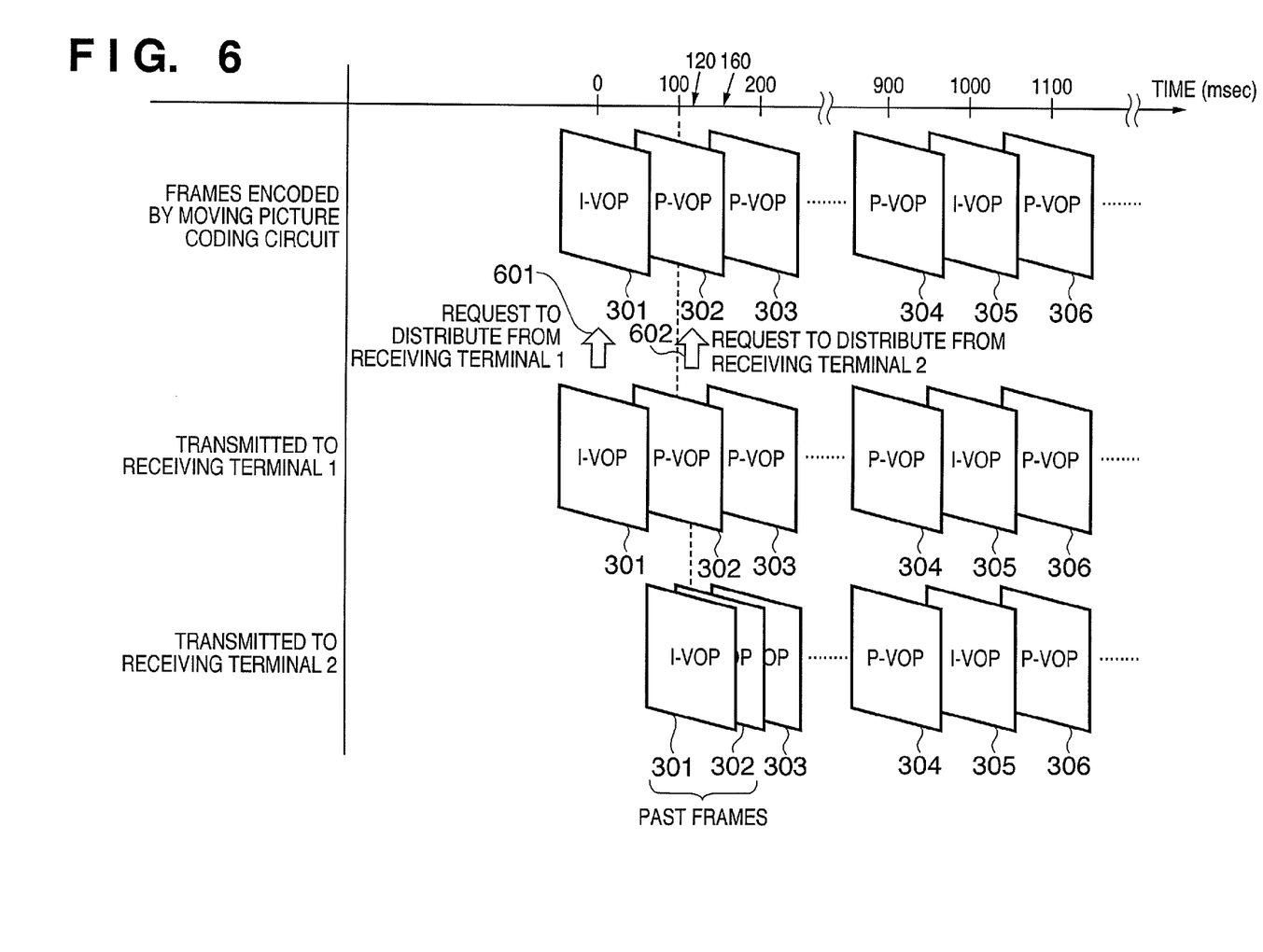
FIG. 6 is a diagram showing the timing of the transmission of moving picture data to a receiving terminal by the data transmission apparatus over time according to the first embodiment of the present invention.

FIG. 6 is a diagram showing the timing of the transmission of moving picture data to a receiving terminal by the data transmission apparatus of the present embodiment over time.

It should be noted that, in FIG. 6, as shown by reference numerals from 301 to 306, the same frames are encoded at the same time by the moving picture coding circuit 101 as in FIG. 3, and are designated by the same reference numerals.

First, when a request for distribution 601 is received from a receiving terminal 1 at a time 0 milliseconds, the frames coded by the moving picture coding circuit 101 are immediately packeted in order from frame 301 and transmitted to the receiving terminal 1.

By so doing, the moving picture frames coded by the moving picture coding circuit 101 are immediately transmitted to either the receiving terminal from which the request for distribution was first received or from which a request for distribution was received at the time an I frame is transmitted. Then, at the receiving terminal 1, the packets' payload data is decoded at the time contained in the time stamp field of that packet header and the moving picture is played back in real time.

By contrast, assume that a request for distribution 602 is received at a time 120 milliseconds from a receiving terminal 2 that is a latecomer terminal. In this case, the coded moving picture frame is not an I frame, and therefore the packet generation circuit 104 calculates the coding time of the next frame using equation (1). If the frame rate is 10 fps, t1=100 milliseconds, and thus t2=200 milliseconds. In addition, the frames that are stored in the moving picture data storage device 105 at time 120 milliseconds are frames 301, 302, and thus e=2.

Therefore, from equation (2), t3=(200−120)/2=40 (milliseconds). As a result, I frame 301 acquired from the moving picture data storage device 105 immediately starts to be transmitted, with transmission of the next P frame 302 starting from 120+40=160 (milliseconds).

Thus, at a time 200 milliseconds when the moving picture coding circuit 101 codes the next frame 303, transmission of the frames that are to be transmitted to the receiving terminal 2 prior to frame 303 is already completed.

As a result, the next coded moving picture frame 303 is not a past frame acquired from the moving picture data storage device 105 but a coded moving picture frames received from the moving picture coding circuit 101, like the transmission to the receiving terminal 1. Thus, in this embodiment, the transmission time interval of past frames is shorter than the transmission time of frames coded in real time (time interval of the frames=100 millisecond). In other words, past frame moving picture data is transmitted at a frame rate that is faster than the coding frame rate, thereby ultimately enabling coded data to be transmitted in real time to a latecomer terminal just like to an existing terminal.

That is, in the example described above, up to time 200 milliseconds when the next frame is to be coded by the moving picture coding circuit 101, past frames recorded in the moving picture data storage device 105 are transmitted to the latecomer receiving terminal 2. As a result, although past moving picture frames are transmitted immediately after the start of transmission of moving picture data to the receiving terminal 2, it is possible to begin transmission without waiting 880 milliseconds until the next I frame is coded.

It should be noted that, for ease of description and understanding, in the present embodiment the past frame transmission time interval is set so that transmission of all stored past frames is completed by the time the next frame is coded in real time. In other words, it is assumed that there is a catching up to the transmission data for the existing terminals at the next (coded in real time) frame (that is, it is possible to transmit the same data to the latecomer terminal as to the existing terminal). However, in some cases the past frame transmission time interval could become very short.

As a result, the equation for calculating the transmission time interval may be as follows:

$$t3=((t2+(\text{frame time interval})*m)-t4)/(e+m) \quad (2')$$

where m is a natural number, and at (m+1) frames from the current time there is a catching up to the real time-coded data transmission timing. In this case, (e+m) frames of past data are transmitted.

Thus, as described above, the data transmission apparatus of the present embodiment uses both a first coding format that does not require information from other frames when decoding and a second coding format that does require information from other frames when decoding, encodes and transmits moving picture data in units of frames, stores past frames that include at least the closest frame that is coded using the first coding format, and starts transmission to a latecomer terminal from such previously stored closest frame coded using the first coding format, thereby enabling playback to start promptly at the latecomer terminal. In addition, since the data transmission apparatus of the present embodiment transmits to an existing terminal that is not a latecomer terminal current frames in coded data, there is no increase in the amount of data transmitted to the existing terminal and moreover there is no need to change the coding process. As a result, there is no great increase in cost and no great decrease in communication resource utilization efficiency.

Second Embodiment

Figure 7:
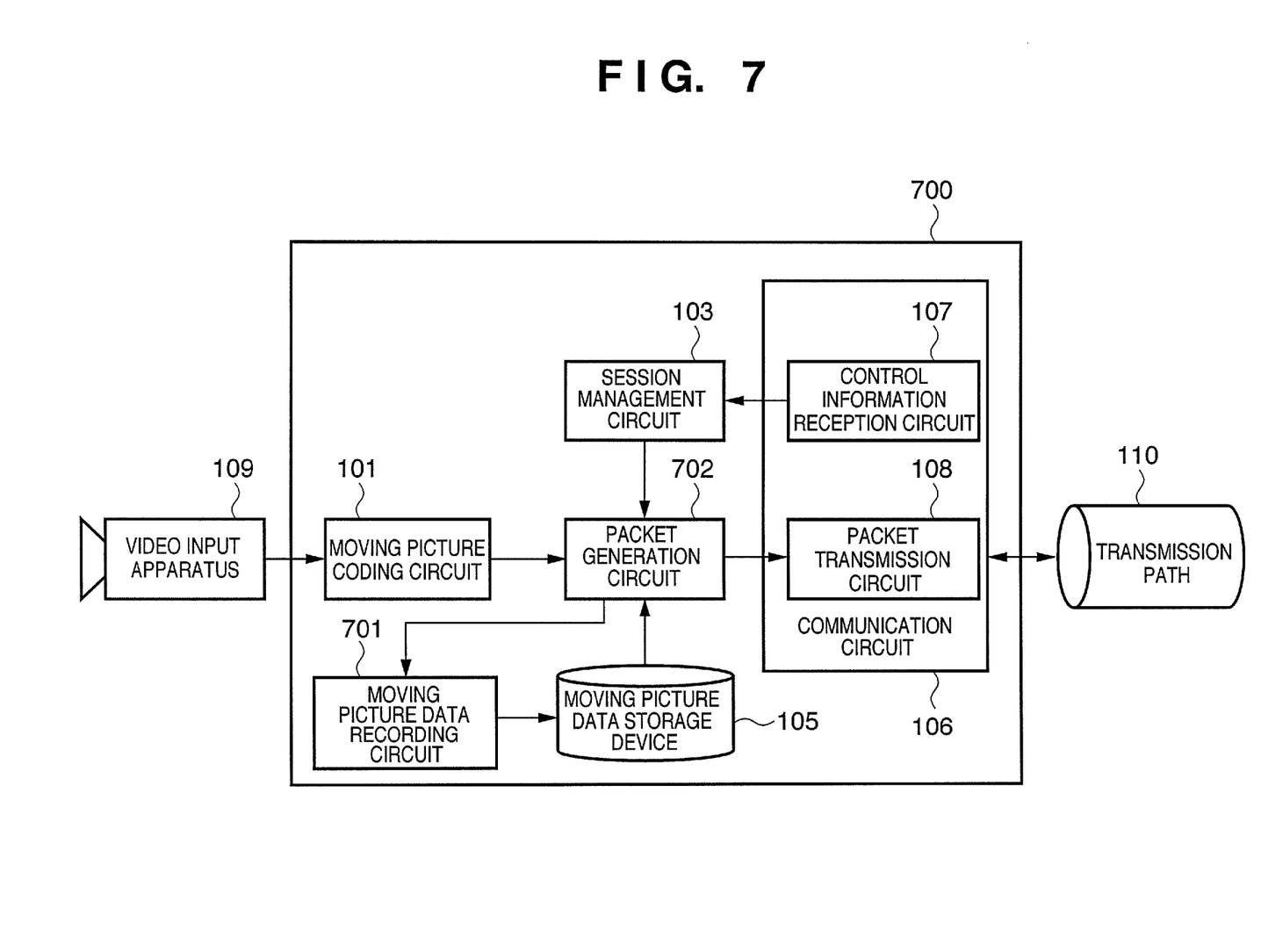
FIG. 7 is a block diagram showing an example of the basic structure of a data transmission apparatus according to a second embodiment of the present invention.

FIG. 7 is a block diagram showing an example of the basic structure of a data transmission apparatus according to a second embodiment of the present invention.

As shown in FIG. 7, in a data transmission apparatus 700 of the present embodiment, a moving picture data recording circuit 701 records moving picture data received from a packet generation circuit 702. In FIG. 7, blocks of the same function as those shown in FIG. 1 (101, 103, 105-110) are given the same reference numerals, and a description thereof is omitted.

The packet generation circuit 702 of the present embodiment packets coded moving picture data received from the moving picture coding circuit 101 and inputs the packet to the packet transmission circuit 108. Further, the packeted data is also input, in payload data units, to the moving picture data recording circuit 701. In other words, in this embodiment, the moving picture data storage device 105 stores packets of data that the packet generation circuit 702 has generated in the past.

Thus, for a latecomer terminal, the packet generation circuit 702 acquires past frames of moving picture data from the moving picture data storage device 105 in packet payload data units and generates a packet.

The data transmission apparatus of the present embodiment records the payload data of the packet generated at the packet generation circuit 702 that is then used for transmission to the latecomer terminal. As a result, even when the moving picture frame size exceeds the maximum date size that can be transmitted in a single transfer along the transmission path, or when a resync marker is present in the moving picture frame, the moving picture frame is not re-packeted, thereby enabling the same transmission control as with the first embodiment.

Third Embodiment

In the above-described first embodiment and second embodiment, the packet generation circuit 104, 702 acquires all the moving picture data stored in the moving picture data storage device 105 and packets it. However, it is not always necessary to transmit all frames, and alternatively, only the leading I frame may be acquired and transmitted to a latecomer terminal.

In this case, after transmitting the leading I frame, the same data as that transmitted to an existing terminal may be transmitted at once, or the next I frame may be awaited. In the former instance, there is a possibility that the P frame decoding effect may be garbled. In the latter case, there is a possibility that the image may appear to stop momentarily. However, since an I frame is played back right after request, the effect of shrinking the waiting time is achieved.

The data transmission apparatus of the present embodiment first transmits only the immediately preceding I frame to the latecomer terminal. As a result, the present embodiment enables transmission that allows playback to start promptly at a plurality of receiving terminals as with the first embodiment, while accomplishing a reduction in communication band and a reduction of the processing load needed to decode and play back the moving picture at the receiving terminals.

Fourth Embodiment

In the third embodiment described above, when configured to transmit only an I frame, a process of recording only an I frame may be conducted.

In the data transmission apparatus of the first embodiment and the second embodiment, the moving picture data storage device 105 must have the capacity to store moving picture data in GOV units at a maximum. As a result, when using a semiconductor memory to implement the moving picture data storage device 105, if the usable storage capacity is small, depending on the moving picture bit rate and frame rate there is a possibility that the storage capacity might be insufficient.

By contrast, according to the data transmission apparatus of the present embodiment, the moving picture data recording circuit 102, 701 records only I frames, and as a result, only the I frames are transmitted immediately to the latecomer receiving terminal. As a result, the storage capacity required for the data transmission apparatus can be reduced. Further, the present embodiment enables transmission that allows playback to start promptly at a plurality of receiving terminals as with the first embodiment, while accomplishing a reduction in communication band and a reduction of the processing load needed to decode and play back the moving picture at the receiving terminals.

Fifth Embodiments

In the embodiments described above, the moving picture coding circuit 101 has the ability to code the moving picture in MPEG-4 format and the packet generation circuit has the ability to generate packet payload data according to RFC3016 (MPEG-4 moving picture payload format). However, moving picture coding and payload packet data generation may be carried out based on MPEG-2 or H.264 coding formats.

With the data transmission apparatus of this embodiment, the moving picture coding circuit 101 codes the moving picture frames based on MPEG-2 and H.264. In addition, the packet generation circuit 104, 702 generates packet payload data according to RFC2250 (MPEG-1, 2 moving picture payload format) and RFC3984 (H.264 moving picture payload format).

Thus, as described above, even when based on other coding formats, it is possible to transmit coded data so as to enable the start of playback promptly at a plurality of receiving terminals.

Sixth Embodiment

In the embodiments described above, the data transmission apparatus has the ability to carry out coding of the moving picture data. However, the moving picture coding circuit and the data transmission apparatus may be separate devices.

In addition, in the embodiments described above, for simplicity, a description is given of request for distribution from two receiving terminals. However, there may be two or more receiving terminals.

The above-described embodiment can also be implemented as software by a computer (or a CPU, MPU or the like) of a system or an apparatus.

Accordingly, since a computer implements the functional processes of the present invention, a program supplied to and installed in the computer itself also accomplishes the present invention. In other words, the computer program for implementing the functional processes of the invention is itself also included within the scope of the present invention.

In that case, so long as the system or apparatus has the capabilities of the program, the program may be executed in any form, such as an object code, a program executed by an interpreter, or script data supplied to an OS.

In this case, the computer program for implementing the functional processes of the present invention by computer is supplied by storage media or by wire/wireless communications. Examples of storage media that can be used for supplying the program are magnetic storage media such as a floppy disk, a hard disk, or magnetic tape, optical/magneto-optical storage media such as an MO, a CD-ROM, a CD-R, a CD-RW, a DVD-ROM, a DVD-R, or a DVD-RW, and a nonvolatile semiconductor memory or the like.

As for the method of supplying the program using wire/wireless communications, there is, for example, a method in which a data file (program data file), either a computer program itself that forms the invention or a file or the like that is compressed and automatically installed, and capable of becoming the computer program that comprises the invention on a client computer, is stored on a server on a computer network. The program data file may be in an executable format, or it may be in the form of source code.

Then, the program data file is supplied by downloading to a connected client computer accessing the server. In this case, the program data file may also be divided into a plurality of segment files and the segment files distributed among different servers.

In other words, a server device that provides program data files for implementing the functional processes of the present invention by computer to one or more client computers is also covered by the claims of the present invention.

It is also possible to encrypt and store the program of the present invention on a storage medium, distribute the storage medium to users, allow users who meet certain requirements to download decryption key data from a website via the Internet, and allow these users to decrypt the encrypted program by using the key data, whereby the program is installed in the user computer.

Besides cases where the aforementioned functions according to the embodiments are implemented by executing the read program by computer, an operating system or the like running on the computer may perform all or a part of the actual processing, so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or part of the actual processing so that the functions of the foregoing embodiment can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-342841, filed on Nov. 28, 2005, which is hereby incorporated by reference herein in its entirety.

What is claimed is:

1. A data transmission apparatus, comprising:
    a storage unit that stores an intra-coded frame obtained by intraframe prediction coding, and an inter-coded frame obtained by interframe prediction coding and following the intra-coded frame stored in the storage unit;
    a receiver that receives a first transmission request for frames from a first receiving terminal and a second transmission request for frames from a second receiving terminal;

a circuit that identifies a transmission time of a frame to be transmitted to the first receiving terminal after the reception of the second transmission request and before a transmission of a next intra-coded frame, wherein the transmission time corresponds to a transmission time interval for transmitting frames to the first receiving terminal and a transmission time of a frame that is transmitted before a reception of the second transmission request; and a transmitter that transmits to the second receiving terminal, by the transmission time identified by the circuit, frames according to the frames stored in the storage unit, if the second transmission request is received while the transmitter is transmitting frames to the first receiving terminal, wherein the transmitter transmits a frame that is transmitted at the transmission time identified by the circuit, to both the first receiving terminal and the second receiving terminal.

2. The data transmission apparatus according to claim 1, further comprising:

a packet generator that generates one or more intra-coded frame packets from an intra-coded frame, and generates one or more inter-coded frame packets from an inter-coded frame;

wherein the packet generator, when generating one or more packets from a plurality of coded frames stored in the storage unit, generates one or more intra-coded frame packets and one or more inter-coded frame packets so that a plurality of coded frames stored in the storage unit are transmitted to the second receiving terminal at a faster frame rate than a frame rate at which a plurality of coded frames are transmitted to the first receiving terminal.

3. The data transmission apparatus according to claim 2, wherein the packet generator, after generating the one or more packets from coded frames stored in the storage unit, generates one or more packets which are to be transmitted to both the first receiving terminal and the second receiving terminal.

4. The data transmission apparatus according to claim 1, wherein, after the transmission time identified by the circuit, the transmitter transmits the same frame to both the first and second receiving terminals.

5. The data transmission apparatus according to claim 1, wherein the storage unit discards the previously-stored coded frame when the storage unit stores a new intra-coded frame.

6. The data transmission apparatus according to claim 1, wherein the circuit identifies a transmission time of an inter-coded frame that is to be transmitted to the first receiving terminal before a transmission of a next intra-coded frame obtained by the intraframe prediction coding to a frame that is to be transmitted to the first receiving terminal; and the transmitter transmits frames according to the frames stored in the storage unit to the second receiving terminal by the transmission time identified by the circuit, if the second transmission request is received while the transmitter is transmitting frames to the first receiving terminal.

7. A data transmission method, comprising steps of:

storing in a storage unit an intra-coded frame obtained by intraframe prediction coding, and an inter-coded frame obtained by interframe prediction coding and following the intra-coded frame stored in the storage unit;

receiving a first transmission request for frames from a first receiving terminal;

receiving a second transmission request for frames from a second receiving terminal;

identifying a transmission time of a frame to be transmitted to the first receiving terminal after the reception of the second transmission request and before a transmission of a next intra-coded frame, wherein the transmission time corresponds to a transmission time interval for transmitting frames to the first receiving terminal and a transmission time of a frame that is transmitted before a reception of the second transmission request; and transmitting to the second receiving terminal, by the transmission time identified in the identifying step, frames according to the frames stored in the storage unit, if the second transmission request is received while transmitting frames to the first receiving terminal, wherein, in the transmitting step, a frame transmitted at the transmission time identified in the identifying step is transmitted to both first receiving terminal and the second receiving terminal.

8. The data transmission method according to claim 7, wherein the identifying step identifies a transmission time of an inter-coded frame that is to be transmitted to the first receiving terminal before a transmission of a next intra-coded frame to the first receiving terminal; and the transmitting step transmits frames according to the frames stored in the storage unit to the second receiving terminal by the transmission time identified in the identifying step, if the second transmission request is received while transmitting frames to the first receiving terminal.

9. A non-transitory computer-readable storage medium configured to store computer-executable instructions that control a data transmission apparatus, the non-transitory computer-readable storage medium comprising:

computer-executable instructions that store in a storage unit an intra-coded frame obtained by intraframe prediction coding, and inter-coded frame obtained by interframe prediction coding and following the inter-coded frame;

computer-executable instructions that receive a first transmission request for frames from a first receiving terminal;

computer-executable instructions that receive a second transmission request for frames from a second receiving terminal;

computer-executable instructions that identify a transmission time of a frame to be transmitted to the first receiving terminal after the reception of the second transmission request and before a transmission of a next intra-coded frame, wherein the transmission time corresponds to a transmission time interval for transmitting frames to the first receiving terminal and a transmission time of a frame that is transmitted before a reception of the second transmission request;

computer-executable instructions that transmit to the second receiving terminal, by the identified transmission time, frames according to the frames stored in the storage unit, if the second transmission request is received while transmitting frames to the first receiving terminal; and computer-executable instructions that transmit a frame transmitted at the transmission time identified, to both the first receiving terminal and the second receiving terminal.

10. A non-transitory computer-readable storage medium according to claim 9, further comprising:

computer-executable instructions that identify a transmission time of an inter-coded frame that is to be transmitted to the first receiving terminal before a transmission of a next intra-coded frame to the first receiving terminal; and computer-executable instructions that transmit frames according to the frames stored in the storage unit to the second receiving terminal by the identified transmission time, if the second transmission request is received while transmitting frames to the first receiving terminal.

11. A data transmission apparatus, comprising:
a storage unit that stores a first intra-coded frame obtained by intraframe prediction coding, and one or more first inter-coded frames obtained by interframe prediction coding and following the first intra-coded frame;
a receiver that receives a transmission request from a receiving terminal;
a circuit that identifies a transmission time of a frame that is to be transmitted to the receiving terminal after the transmission request is received and before the data transmission apparatus transmits a second intra-coded frame next to the first intra-coded frame, wherein the transmission time corresponds to a transmission time interval for transmitting frames to the receiving terminal and a transmission time of a frame that is transmitted before a reception of the transmission request; and
a transmitter that transmits, in response to the transmission request being received, to the receiving terminal, by the transmission time identified by the circuit, both the first intra-coded frame and the one or more first inter-coded frames.

12. A data transmission apparatus according to claim 11, wherein the circuit identifies a transmission time of a second inter-coded frame that is to be transmitted to the receiving terminal after the transmission request is received and before the second intra-coded frame is transmitted, and
wherein there is no intra-coded frame between the first intra-coded frame and the second intra-coded frame.

13. A data transmission apparatus according to claim 11, wherein the storage unit discards the previously-stored coded frame when the storage unit stores a new intra-coded frame.

14. A data transmission method, comprising steps of:
storing in a storage unit a first intra-coded frame obtained by intraframe prediction coding, and one or more first inter-coded frames obtained by interframe prediction coding and following the first intra-coded frame;
receiving a transmission request for frames from a receiving terminal;
identifying a transmission time of a frame that is to be transmitted to the receiving terminal after the transmission request is received and before transmission of a second intra-coded frame next to the first intra-coded frame, wherein the transmission time corresponds to a transmission time interval for transmitting frames to the receiving terminal and a transmission time of a frame that is transmitted before a reception of the transmission request; and
transmitting, in response to the transmission request being received, to the receiving terminal, by the transmission time identified in the identifying step, both the first intra-coded frame and the one or more first inter-coded frames.

15. A non-transitory computer-readable storage medium configured to store computer-executable instructions that control a data transmission apparatus, the computer-readable storage medium comprising:
computer-executable instructions that store in a storage unit a first intra-coded frame obtained by intraframe prediction coding, and one or more first inter-coded frames obtained by interframe prediction coding and following the first intra-coded frame;
computer-executable instructions that receive a transmission request from a receiving terminal;
computer-executable instructions that identify a transmission time of a frame that is to be transmitted to the receiving terminal after the transmission request is received and before the data transmission apparatus transmits a second intra-coded frame next to the first intra-coded frame, wherein the transmission time corresponds to a transmission time interval for transmitting frames to the receiving terminal and a transmission time of a frame that is transmitted before a reception of the transmission request; and
computer-executable instructions that transmit, in response to the transmission request being received, to the receiving terminal, by the transmission time identified, both the first intra-coded frame and the one or more first inter-coded frames.

16. A data transmission apparatus, comprising:
a storage unit that stores a first intra-coded frame obtained by intraframe prediction coding, and one or more first inter-coded frames obtained by interframe prediction coding and following the first intra-coded frame stored in the storage unit;
a receiver that receives a transmission request from a receiving terminal;
a circuit that identifies a transmission time of a frame that is to be transmitted to the receiving terminal after the transmission request is received and before the data transmission apparatus transmits a second intra-coded frame next to the first intra-coded frame, wherein the transmission time corresponds to a transmission time interval for transmitting frames to the receiving terminal and a transmission time of a frame that is transmitted before a reception of the transmission request; and
a transmitter that transmits, in response to the transmission request being received, frames according to the first intra-coded frame and one or more first inter-coded frames stored in the storage unit to the receiving terminal so that a frame rate of frames transmitted before the transmission time identified by the circuit is faster than a frame rate of frames transmitted after the transmission time identified by the circuit.

17. A data transmission apparatus according to claim 16, wherein the circuit identifies a transmission time of a second inter-frame that is to be transmitted to the receiving terminal after the transmission request is received and before the second intra-coded frame is transmitted, and
wherein there is no intra-coded frame between the first intra-coded frame and the next intra-coded frame.

18. A data transmission apparatus according to claim 16, wherein the storage unit discards the previously-stored coded frame when the storage unit stores a new intra-coded frame.

19. A data transmission method, comprising steps of:
storing in a storage unit a first intra-coded frame obtained by intraframe prediction coding and one or more first inter-coded frames obtained by interframe prediction coding and following the first intra-coded frame;
receiving a transmission request from a receiving terminal;
identifying a transmission time of a frame that is to be transmitted to the receiving terminal after the transmission request is received and before transmission of a second intra-coded frame next to the first intra-coded frame, wherein the transmission time corresponds to a transmission time interval for transmitting frames to the receiving terminal and a transmission time of a frame that is transmitted before a reception of the transmission request; and transmitting, in response to the transmission request being received, frames according to the first intra-coded frame and one or more first inter-coded frames stored in the storage unit to the receiving terminal so that a frame rate of frames transmitted before the transmission time identified in the identifying step is faster than a frame rate of frames transmitted after the transmission time identified in the identifying step.

20. A non-transitory computer-readable storage medium configured to store computer-executable instructions that control a data transmission apparatus for transmitting coded moving picture data to a receiving terminal, the non-transitory computer-readable medium comprising:

computer-executable instructions that store in a storage unit a first intra-coded frame obtained by the intraframe prediction coding and one or more first inter-coded frames obtained by interframe prediction coding and following the first intra-coded frame;

computer-executable instructions that receive a transmission request from a receiving terminal;

computer-executable instructions that identify a transmission time of a frame that is to be transmitted to the receiving terminal after the transmission request is received and before the data transmission apparatus transmits a second intra-coded frame next to the first intra-coded frame, wherein the transmission time corresponds to a transmission time interval for transmitting frames to the receiving terminal and a transmission time of a frame that is transmitted before a reception of the transmission request; and computer-executable instructions that transmit, in response to the transmission request being received, frames according to the first intra-coded frame and one or more first inter-coded frames stored in the storage unit to the receiving terminal so that a frame rate of frames transmitted before the identified transmission time is faster than a frame rate of frames transmitted after the identified transmission time.

* * * * *